United States Patent [19]

Antonini

[11] Patent Number: 5,636,281
[45] Date of Patent: Jun. 3, 1997

[54] METHOD AND DEVICE TO AUTHORIZE ACCESS TO AN INSTRUMENT COMPRISING A COMPUTERIZED OPERATING SYSTEM

[76] Inventor: Pierre Antonini, 3, rue Léon Dierx, 75015 Paris, France

[21] Appl. No.: 214,611

[22] Filed: Mar. 17, 1994

[30] Foreign Application Priority Data

Mar. 18, 1993 [FR] France ..................... 93 03150

[51] Int. Cl.⁶ ..................................... H04L 9/06
[52] U.S. Cl. ................................. 380/25; 380/50
[58] Field of Search .................. 380/4, 25, 50; 375/27

[56] References Cited

U.S. PATENT DOCUMENTS

| | | | |
|---|---|---|---|
| 4,319,079 | 3/1982 | Best | 380/4 |
| 4,432,207 | 2/1984 | Best | 380/4 |
| 4,465,901 | 8/1984 | Best | 380/4 |
| 4,683,553 | 7/1987 | Mollier | 380/25 |
| 4,742,351 | 5/1988 | Suzuki | 380/25 |
| 4,807,288 | 2/1989 | Ugon et al. | 380/25 |
| 4,885,788 | 12/1989 | Takaragi et al. | 380/25 |
| 4,893,123 | 1/1990 | Boisson | 375/27 |
| 5,048,085 | 9/1991 | Abraham et al. | 380/25 |
| 5,148,481 | 9/1992 | Abraham et al. | 380/46 |
| 5,191,608 | 3/1993 | Geronimi | 380/4 |
| 5,249,232 | 9/1993 | Erbes et al. | 380/4 |
| 5,317,636 | 5/1994 | Vizcaino | 380/24 |
| 5,406,624 | 4/1995 | Tulpan | 380/4 |

FOREIGN PATENT DOCUMENTS

| | | |
|---|---|---|
| 0421409 | 4/1991 | European Pat. Off. . |
| 0520228 | 12/1992 | European Pat. Off. . |

*Primary Examiner*—Salvatore Cangialosi
*Attorney, Agent, or Firm*—Nilles & Nilles S.C.

[57] ABSTRACT

Methods that enable the providing of authorization for the use of an instrument comprising a computer for a period limited by a date or limited to a number of hours. The method consists in mingling the data elements of the program memory to be protected according to a secret order. To use this memory, a transcoding device is then used. This transcoding device makes it possible to restore the right order of reading the instructions contained in the memory. This transcoding device is preferably in the form of a memory that contains several tables, only one of which gives the right transcoding data elements. The choice between these tables is made under control that make it possible to determine rights of access to the instrument. These are preferably assembled together in the form of a smart carrier that gets inserted between the normal carrier of the program memory and this program memory itself. It can be used to check the rental period of instruments comprising computer systems and to obtain protection against the unauthorized use of the program memory.

19 Claims, 4 Drawing Sheets

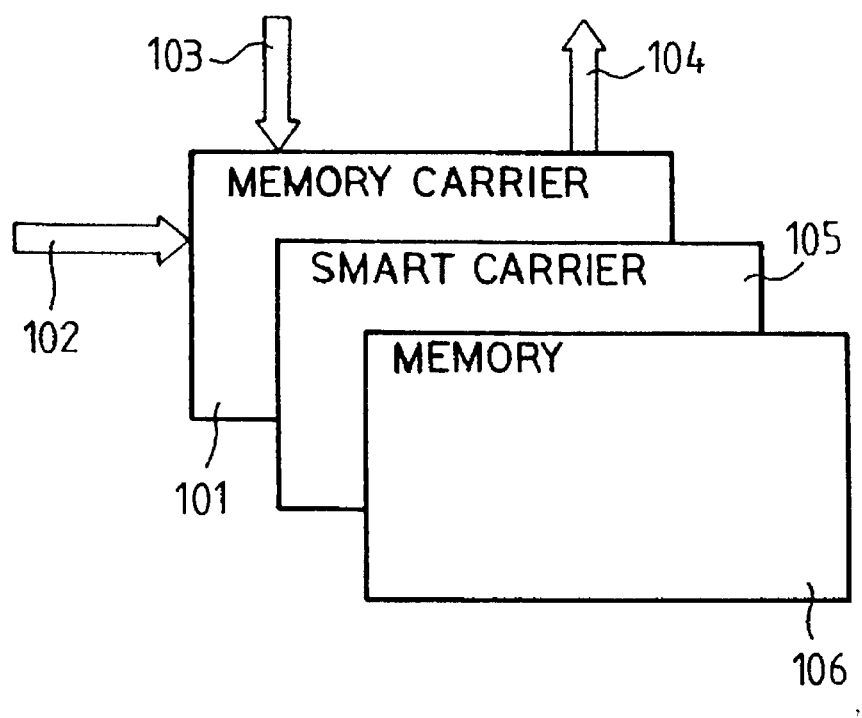
FIG_1
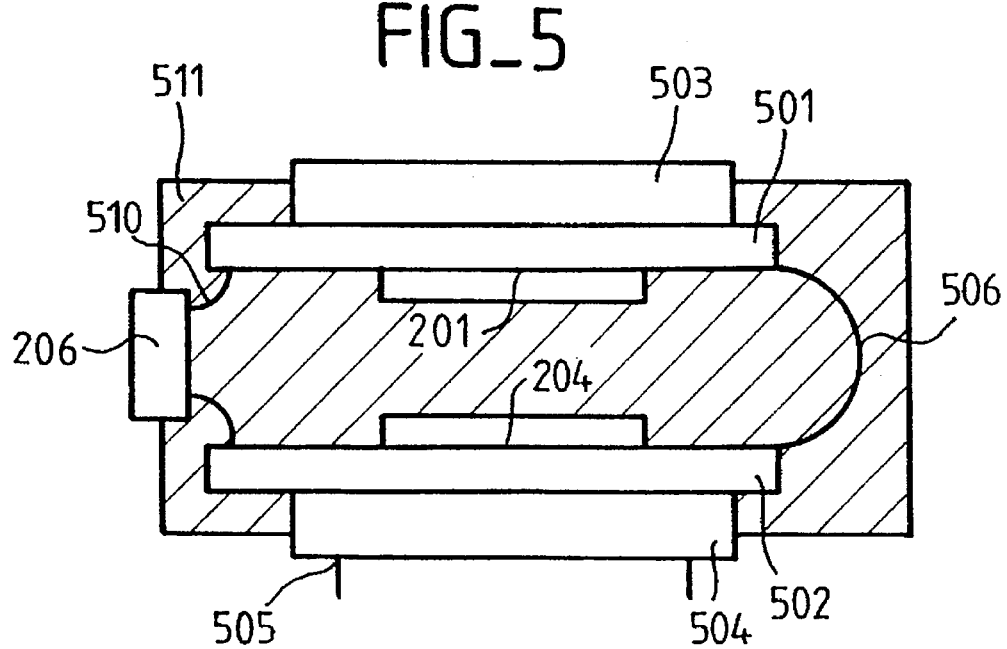
FIG_5

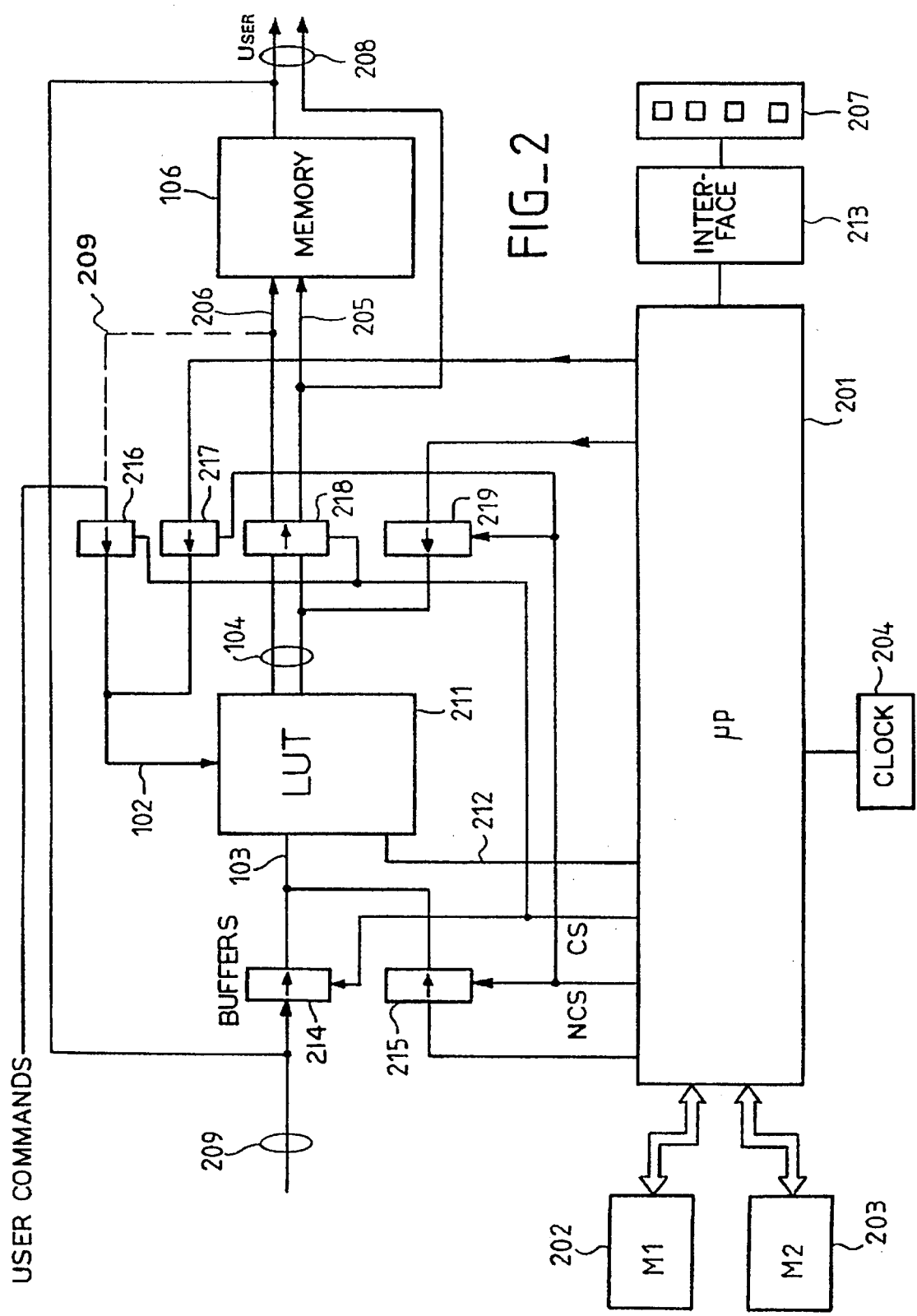
FIG_2

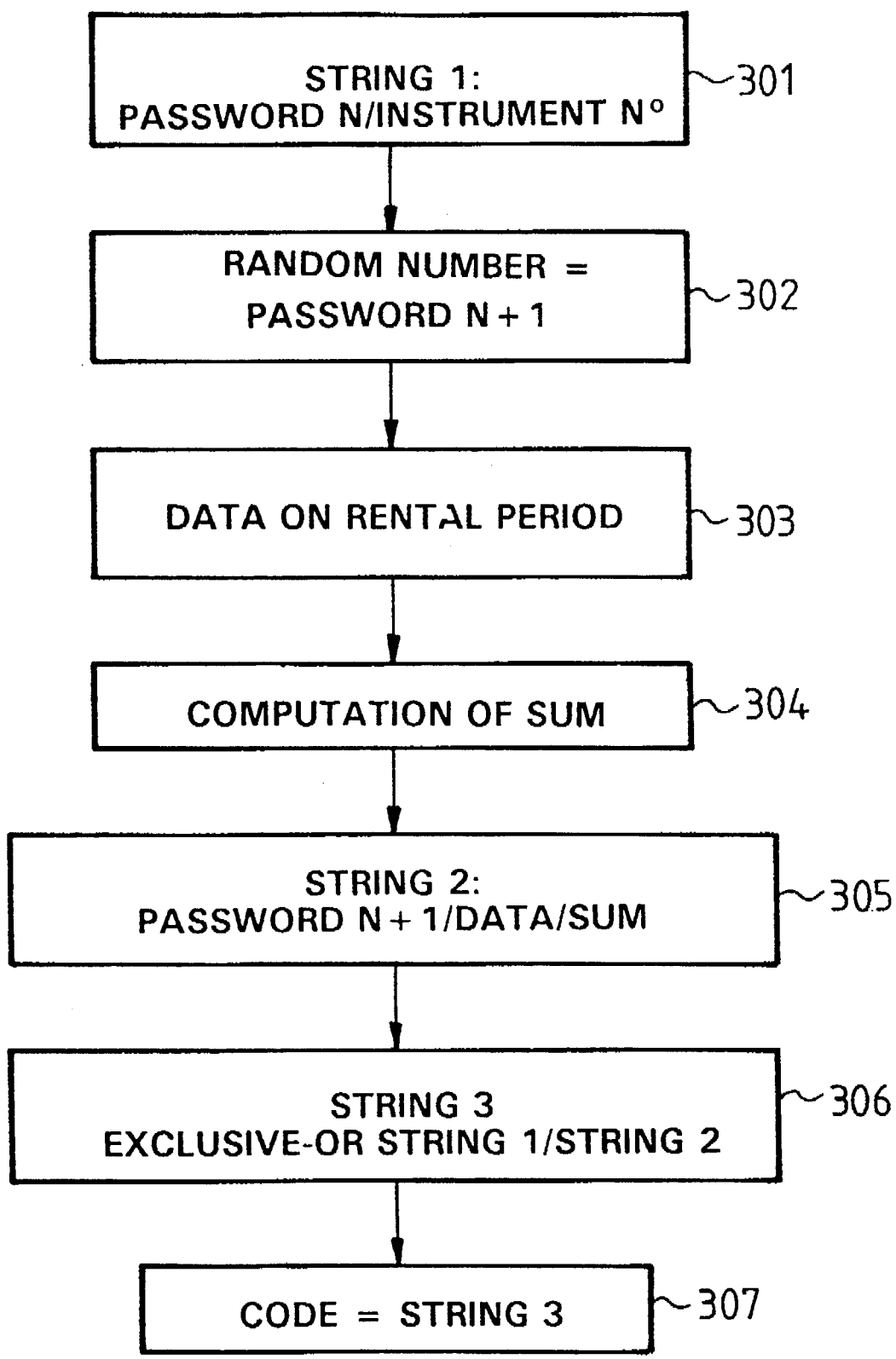

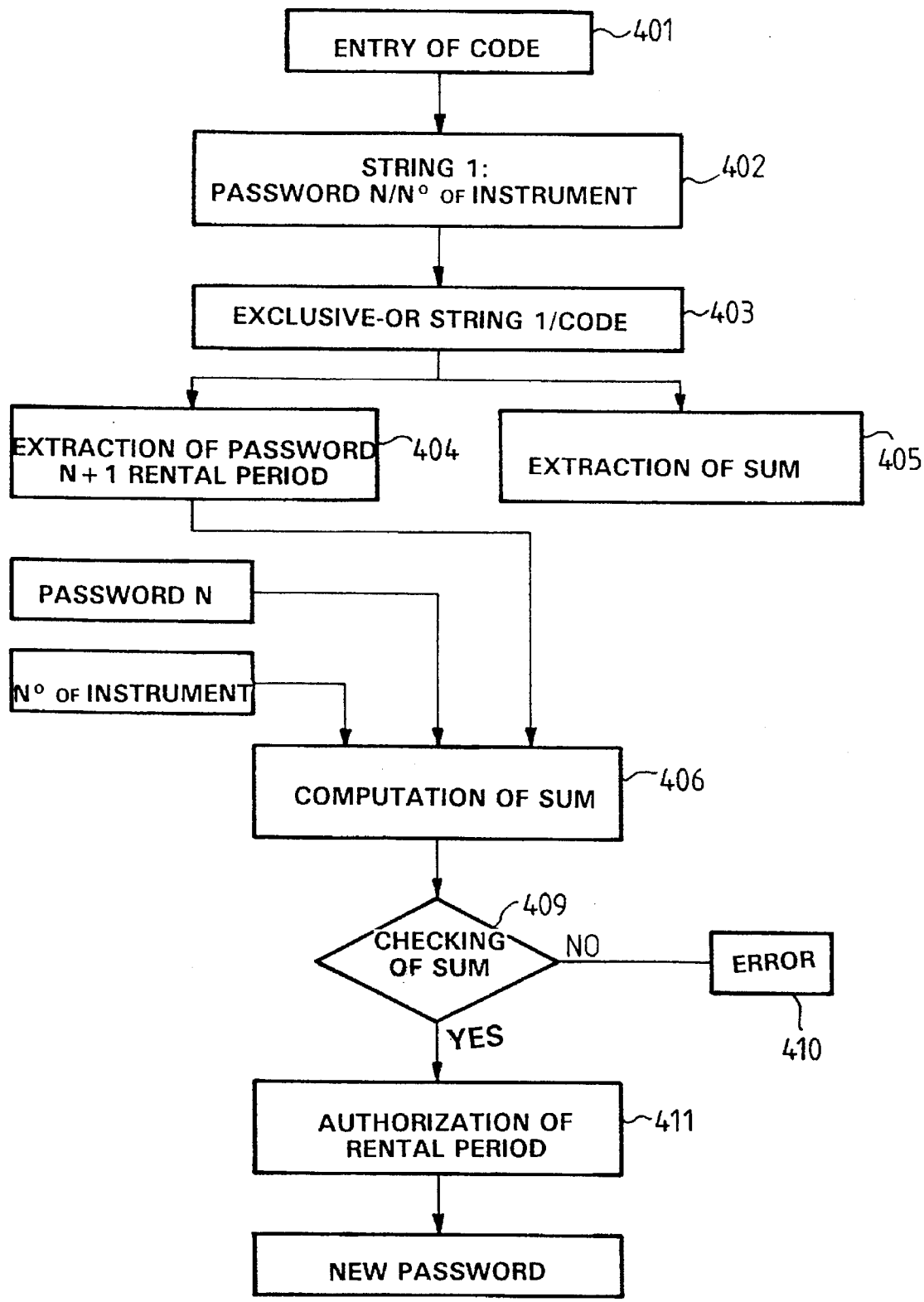

METHOD AND DEVICE TO AUTHORIZE ACCESS TO AN INSTRUMENT COMPRISING A COMPUTERIZED OPERATING SYSTEM

BACKGROUND OF THE INVENTION

1. Field of the Invention

The present invention relates to methods and devices that make it possible to authorize access to an instrument or apparatus on the basis of events that are independent of the user's will, by inhibiting the operation of the computer device used to the control the apparatus. It can be applied more particularly to the case of instruments that are rented out and for which checks are to be made, for example on the number of hours of use or on a rental limit date.

2. Description of the Prior Art

It is become increasingly frequent for all kinds of instruments, such as measuring instruments for example, to work under the control of a computerized operating system that generally comprises a microprocessor, an operating random-access memory, a saved memory comprising the programs of the system, keyboard type control devices and screen type display devices. These different devices are joined together by address, control and data buses in a structure that is very similar to that of PC type microcomputers. This multi-purpose type of structure can be applied to many instruments to collect data and send out commands by the simple adaptation, depending on the instrument used, of the control program contained in the memory of the computer system. Thus, costs are sharply reduced and it is furthermore possible to connect all these instruments together by means of standardized linking devices, whether at the level of the buses themselves, such as IEEE type buses or at the level of series or parallel type links.

Current practice, which is related to problems of costs and rapid obsolescence, is leading industrialists to take these instruments out on rent instead of purchasing them. The renting-out party naturally wishes to have guarantees regarding possible misuse of the instrument by limiting the rental period, for example, to a certain number of hours for instruments that wear out during operation, or to a certain duration to prevent the instrument from continuing to function if the customer should keep it or if the instrument should disappear.

To this end, it has been thought of using counter type or calendar clock type systems which, for example, cut off the power supply to the instrument. Until now, these different systems have not been very satisfactory because it is fairly easy to infringe their limits.

SUMMARY OF THE INVENTION

To obtain a more secure system, the invention proposes a method for authorizing access to an instrument comprising an computer-based operating system, said system comprising a program memory fixed in a removable way to a carrier (that fulfils the functions of both a medium and a support) wherein, chiefly, means are inserted between the program memory and the carrier making it possible to transcode at least the access addresses or the data elements or the commands of this program memory and wherein the data elements contained in this program memory are mingled in such a way that they can make the computer-based system work only after they have been properly decoded by said transcoding means. This transcoding prevents the instrument from working without the decoding, hence without the presence of the invention.

In the invention, so that existing machines can be used, the carrier is connected to a normal bus that links the different parts of the instrument to one another. Consequently, the commands and data elements that are conveyed by this bus continue to be commands and data elements of the instrument as in its basic configuration. Nothing changes. Furthermore although, in the present description, the invention shall be described with a transcoding table, this transcoding can be done with a microcontroller that is loaded with this transcoding alone or with this transcoding among other elements. This microcontroller is then associated with a program memory that contains the transcoding program. If need be, the function of this microcontroller can be fulfilled by using a programmable logic circuit (PLA or programmable logic array) containing numerous logic gates arranged in a matrix array.

BRIEF DESCRIPTION OF THE DRAWINGS

Other particular features and advantages of the invention shall appear more clearly from the following description made with reference to the appended drawings, of which:

FIG. 1 shows a diagram, in cavalier projection, of the program memory of an instrument such as this with a transcoding package inserted between itself and its carrier;

FIG. 2 shows an electronic diagram of the transcoding means;

FIGS. 3 and 4 show flowcharts of the method used to modify the contents of the transcoding memory; and FIG. 5 shows a sectional view of the transcoding package.

MORE DETAILED DESCRIPTION

Owing to its protective character, the invention can also protect the program contained in the memory against unauthorized duplication in the case of optional programs.

FIG. 1 shows a very schematic view of the parts that constitute the program memory of an apparatus working according to the intention. In a very standard way, these parts comprise a memory carrier 101 (fulfilling the functions of both a medium and a support) that is connected to the other parts (not shown) of the system by an address bus 102, a control bus 103 and a data bus 104. Usually, the memory 106 which comprises the instructions of the operating program of the computer system and which is therefore memory such as an EPROM, an EEPROM or a RAM that is saved, for example, in order to keep these information elements in the memory even when the system is not working, is directly connected to the carrier 101.

The invention uses an intermediate carrier 105 which shall be called a smart carrier and is interposed between the standard carrier 101 and the program memory 106. This carrier 105 has, on one side, pins designed to match the carrier 101 and, on the other side, a carrier with contacts designed to receive the pins of the memory 106. According to the invention, the carrier 105 comprises at least one specific wiring that enables the transcoding of the data elements, the addresses and the commands intended for the memory 106 in such a way that this memory 106, whose contents are then transcoded, contains information elements which, if necessary, will stop or disturb the working of the computer system whose operating program is contained in this very same memory 106.

To obtain this transcoding, the invention proposes the use, on one example, of a programmable logic array constituting an intermediate memory whose inputs are the addresses of the data elements contained in this intermediate memory.

These same data elements, which are available at the data outputs, form the addresses for the final memory 106 or data elements for the system. The contents of the memory 106 will naturally have been programmed in such a way that the right instructions correspond to the addresses after decoding in the intermediate memory. This intermediate memory will be called a LUT (or Look-Up Table).

If, therefore, there is an intermediate memory having as many outputs as it has inputs, eight outputs for eight inputs for example, there is a simple transcoding that provides relatively limited protection.

If, on the contrary, a larger-sized memory is used, comprising for example ten inputs and eight outputs, then there is the equivalent of four different transcoding tables, only one of which will be the right one, the other three being programmed, for example randomly, to obtain a reading of the final memory 106 that is quite incoherent. Rather than having an incoherent programming it is possible, on the contrary, to have a particular programming that would lead the computer system to behave coherently but without meeting the user's wishes. It is possible, for example, to conceive of obtaining a display indicating that the rental period is over.

In a particularly promising variant, this particular program will be such that it carries out a transcoding operation after a first intervention. This transcoding makes the direct reading of data elements contained in the memory insignificant, without the putting of the transcoding into operation. The value of this approach is that, in this case, one and the same memory integrated circuit comprises the encoded program and the parametrizing (namely the setting of the parameters) of the decoding of this encoded program. The decoding program then no longer holds any secrets. The instrument itself will not be protected. On the contrary, its use will be protected. Thus, the final memory 106 will comprise a non-transcoded part which will be read and then executed by the processor of the instrument or processor of the smart carrier, this execution putting the transcoding into operation at a given level. For example, the encryption will be parametrized (i.e. it will have its parameters set) as a function of what has been read beforehand, or even at a previous reading. This parametrization or setting of parameters may lead to the use of another part of the transcoding memory which furthermore can be used on condition that certain logic conditions are met. These logic conditions are themselves subjected to the updating of a subscription. The parametrization may thus lead to an additional session of use or to a use that is itself more complete or is different from that of the final memory. For example, certain data elements that are necessary for the progress of a part of the main program may be validly included by a reading of the LUT if the transcoding has been complemented by an additional parametrization.

The selection from among the available tables is therefore done by the additional inputs, and it can well be understood that, in the case of ten inputs for eight outputs, there are two additional inputs available, making it possible to choose from among four tables. The minimum, of course, is to have an additional input to enable a choice between a right transcoding table and a wrong one but, of course, it may be useful to have a greater number of them to increase the possibilities of different combinations in order to make it possible to provide a large number of instruments with this same system of protection without any risk that it might be duplicated between two different instruments.

Thus, therefore, in the case of a memory with sixteen address inputs and eight data outputs, i.e. a very standard type of 64-byte memory, there will be several thousands of combinations available with a very standard type of device.

Indeed, one of the advantages of the invention is that it enables the use of circuits, especially memory circuits, that are commonly available in the market, without its being necessary to manufacture specialized circuits.

FIG. 2 shows an elaborate version of the smart carrier 105 of FIG. 1. This smart carrier has a microprocessor 201 that controls its working by means of a first memory M1 202 that contains its operating instructions and a second memory M2 203 that has variable data elements which may correspond, for example, to the authorized rental periods, the serial number of the instrument, the date of the contract etc.

If necessary, these memories M1 and M2 may be integrated into the microprocessor 201 as is commonly the case.

The carrier 105 furthermore comprises a real-time clock 204 which is protected, for example, by a long-life cell, for example a lithium cell, that is integrated into the carrier as is commonly the case.

The LUT memory comprising the transcoding data elements is a memory 205 which therefore has its command bus 102, address bus 103 and data bus 104. The LUT memory enables the transcoding of the addresses and the commands coming from the user as well as of the data elements coming from the memory 106. As a result of this, not only are wires of the data bus 104 connected to the wires of the address bus 205 or control bus 206 of the memory 106 but also wires of the data bus 208 of the memory 106 are connected to wires of the address bus 209 of the LUT memory. As a variant, the user commands bus 210 is not transcoded (link shown by means of dashes).

In this example, the number of the address wires coming from the basic carrier 101 of the instrument that receives the smart carrier 105 is the same as the number of wires that come out on the data bus 104 and that correspond to the address wires intended for the control memory 106. In order to then have the right transcoding, corresponding to the selection of the desired table in the LUT 211, the address bus 103 comprises the sufficient number of additional wires coming from the microprocessor 201. This microprocessor 201 will select, at least through a wire 212, the right table as a function of the elements contained in the memory M2 and of the information elements relating to date and time coming from the clock H. There will, for example, be eight address wires coming from the exterior to the bus 103, eight wires going outwards on the bus 104 and eight wires coming from the microprocessor 201 and getting joined to the other eight wires of the address bus 103.

Furthermore, according to an optional improvement, the smart carrier 105 has an additional interface 213, of the series type for example, that is connected externally to a data acquisition and possibly display device 207, of the keyboard/screen type for example, that enables the modification, under the control of the microprocessor 201, of the data elements contained in the memory M2 or the LUT 211. This makes it possible, at the end of the rental contract for example, to extend the duration or period of this contract, subject of course to agreement between the renting party and the renting-out party. For this purpose, enciphering algorithms will be used, making it possible to obtain a modification such as this without any risk of decoding by an unauthorized individual. In practice, the LUT memory and the memory M2 are one and the same memory.

When there is no such system, another approach consists, for example, in purely and simply discarding the smart carrier which, as has been seen, can be made out of standard and inexpensive elements that are commercially available.

Another approach could consist in stipulating a series of rental periods in advance in the memory M2, each period corresponding to a particular table in the LUT 211 which, it has been seen, may include a very large number of distinct tables. This would mean changing the program memory of the instrument comprising the smart carrier. This memory will naturally be programmed so as to be decoded by the table on an ad hoc basis. Given the cost of memories at the present time, this approach could be very inexpensive and could compare advantageously with other methods.

To obtain additional security, it is perfectly possible, in addition to the transcoding of the addresses of the program memory, to carry out an operation, in reverse, for the transcoding of the data elements contained in this memory. Thus, each data element read will serve as an address in an LUT which may be common with the LUT for transcoding the reading addresses, and the data element thus read in the LUT will then serve as commands that can be used by the instrument which works under the control of the program memory.

The changing of the LUT, for example in order to increase the amount of credit in terms of hours, is particularly worthwhile in systems wherein no microprocessor is used and where it is the fairly difficult to change the data elements corresponding to the rental period. At that point in time, direct use could be made of the data elements relating to the date and/or time that are obtained from the clock 204 to select the right table in the LUT. When the rental period is over, then the transcoding table selected in the LUT 211 by the clock will be the wrong table. This is obtained quite simply by connecting a most significant output of a counter controlled by the clock to an additional address input or command input of the LUT. As soon as the most significant bit of this counter flips over, the transcoding of the LUT is modified. There is then no mechanical relay or additional electronic circuit to be added in order to invalidate the use. In practice, it may be enough for the LUT to have a capacity that is at least twice the number of the addresses and data elements to be transcoded. The changing of the LUT will then consist in setting up a new LUT in which the direct selection by means of the time data of the clock will again enable the right transcoding to be obtained. It is naturally quite possible to use one and the same structure by changing the contents of the LUT by means of a microprocessor, but this procedure is generally not useful and it is most usually preferable to modify the data elements of the memory 203 of this microprocessor. In this case, where the transcoding is parametrized, certain parts of the LUT become accessible after the parametrization. As a variant, the parametrization modifies the execution of a transcoding microprogram implemented by a transcoding microcontroller.

In the preferred embodiment, the microprocessor compares the date programmed in the memory 203 with the date given by the clock 204, or else the credit, in terms of hours, contained in this memory 203 with a totalled value of the period of operation which is itself stored in this memory 203. In the case of the credit in terms of hours, this credit has to be decremented as and when time elapses without this countdown being affected by any instances where the instrument is turned off. Different modalities may be used to this end. Whenever the power is turned on, the microprocessor may, for example, store the credit contained in the memory 203, decrement this credit as a function of the time elapsed, the value of which is delivered by the clock 204 and, at regular intervals, refresh the credit contained in the memory 203 by the new value obtained by this decrementing operation. It is also possible to set aside a compartment in the memory 203, corresponding to the time that has elapsed during the working of the instrument, determined from the point in time when the instrument is turned on, and to provide for incrementing the content of this position as and when the operation goes ahead. At each incrementation, the microprocessor compares the contents of this compartment with the credit in terms of hours which is itself stored in the memory 203 and when equality is achieved it scrambles the decoding of the operating memory 106 by means of the addressing 212 of the LUT 211.

In most cases, it will be preferred to renew the authorization for use directly at the customer's premises, for example through the acquisition keyboard 207, in order that the transactions between the renting-out party and the renting party may be limited to the furnishing of a code in exchange for payment.

Naturally, it should be possible, precisely by means of a code such as this, to protect the new authorization for use and possibly the duration of this authorization except when it has been planned, in advance, that it will have a fixed determined value.

There are different known ways of encryption that can be used to this end, for example the algorithm known as the DES algorithm. However, this algorithm has many drawbacks. These drawbacks are, for example, a substantial length of acquisition that could lead to errors and the use of public keys which, despite being so named, are not available to all and sundry.

Hence, in order to enable the modification of the authorization to use the instrument, the invention proposes the method taking the form of the algorithms shown in FIGS. 3 and 4.

At the renting-out party's premises, after an extension of the rental authorization has been agreed upon, a string No. 1 is created in a step 301. This string No. 1 is formed by the concatenation of a password N and the number of the instrument controlled by the device, both being contained in the memory 203.

In a step 302, known techniques are used to create a random number that has a determined length and will constitute the password N+1.

In a step 303, data elements corresponding to the rental period are determined in terms of either hours or dates.

Then, in a step 304, the sum of all the characters forming the password N, the instrument number, the rental period and the password N+1 is computed. There is thus obtained a checking number which shall be called the "sum" and has the same nature as a parity information element.

In a following step 305, a string No. 2 is then prepared by concatenating the password N+1, the data elements pertaining to rental period and the number obtained in the step 304.

In a step 306, an operation known as an exclusive-OR operation is then carried out between the string 1 and the string 2. The result of the operation gives a string No. 3 which forms a result code 307 that will be transmitted to the renting party. As compared with the password N+1 and the new rental period, this code is sufficiently protected so as not no be easily decoded by the renting party while at the same time being relatively easy to generate and decode by means of the microprocessor itself.

When the renting party has received the result code thus determined, then, by means of the keyboard 207, he starts entering a command intended for the microprocessor 201 so that it can receive the result code, check it and modify the contents of the memory 203 accordingly.

When the microprocessor 201 is in this state, which may possibly be reported by the display means attached to the keyboard 207, the renting party enters the result code corresponding to the string 3 in a step 401 shown in FIG. 4.

The microprocessor then generates the string No. 1 by the concatenation, in a step 402, of the password N and the number of the instrument, both of which are contained in the memory 203. This is possible since both these elements are known to it.

Then, in a step 403, it carries out an "exclusive-OR" operation between the string No. 1 which is thus reproduced and the received result code. Since this received code corresponds to the string No. 3, the result of this "exclusive-OR" operation forms the string No. 2 which, it is recalled, contains the concatenated password N+1, rental period and sum intended for the operation of verification. This is one of the particular features of the "exclusive-OR" operation. It would be possible, however, to replace the "exclusive-OR" function by other mutually reciprocal functions.

Then, by simple segmentation, the password N+1 and the rental period are extracted in a step 404 and the sum is extracted in a step 405.

Then, in a step 406, the sum is computed on the basis of the password N+1 and the rental period obtained in the step 404 as well as the password N and the number of the instrument, the last two data elements being read in the memory 203.

Then, in a step 409, the sum thus computed is compared with the sum extracted in a step 405.

If everything is as it should be, and especially if the code entered in the step 401 is the right code, then this sum thus computed is identical to the sum obtained in the step 405.

If the result is false, the operation reaches an error step 410 which triggers appropriate actions, for example an inhibition, of variable length, of the device, designed to prevent successive routine tests.

If the result is right, the operation ends in a step 411 by the refreshing, in the memory 203, of the rental authorization, in terms of either duration or dates and, in a step 412, the password N is replaced by the password N+1 which was obtained in the step 404.

To modify the LUT, transmission buffers such as 214 to 219 are interposed between, on the one hand, the address bus 103, the data bus 104 and the control bus 102 of the LUT and, on the other hand, respectively the same user buses or buses of the microprocessor 201. These buffers all have a CS input that can be controlled by a CS or NCS signal sent out by the microprocessor 201. In normal times, the CS signal is active and the LUT 211 does the transcoding. When the LUT has to be modified, the NCS signal is active and this LUT is uncoupled from the instrument, and its address, data and control buses are then controlled by the microprocessor 201 which itself is controlled by means of the keyboard 207. This keyboard 207 then includes another command for placing the LUT under the control of the microprocessor 201.

As was seen at the outset, the invention proposes to place the smart carrier 105 between the EPROM carrier 101 and the EPROM 106 itself.

To this end, a preferred embodiment shown in FIG. 5 uses two preferably dual-faced small printed circuit wafers 501 and 502, having dimensions that are substantially equal to or slightly greater than those of the EEPROM of the LUT. These wafers are placed one on top of the other and, on their faces that are directed outwards, one of them bears a male connector 504 having pins 505 (the EEPROM carrier is assumed to be of the female type) while the other bears an EPROM or EEPROM carrier 503 which is identical to the carrier 101. In this way, the device gets fitted exactly between the EPROM and its carrier.

In the space between the wafer 501 and 502, the electronic elements of FIG. 2, designed to make this carrier a smart carrier, have been fixed to the printed circuits.

To obtain a device that is as small as possible, the components used will preferably be of the surface mounted type (SMCs or surface-mounted components) forming, for example, the microprocessor 201 and the clock 204 as shown in this FIG. 5.

The two faces of each circuit are joined in a known way by metallized holes or vias and the circuits are connected to one another by links 506 formed, for example, by rigid wires that are curved as desired or else by a flexible printed circuit strip comprising tracks designed to obtain the necessary connections.

The series interface 206 is fixed to the side of the unit and is joined to either or both the printed circuits by means of a connection 510.

The unit is then molded within an encapsulating material 511 so as to obtain a small-sized parallelepiped-shaped compact element that can be inserted very easily between the EPROM and its carrier. It is easy to obtain a device whose thickness does not exceed 12 mm, thus making it possible to comply with the standard values of spacing between the cards of computer systems.

What is claimed is:

1. A protected instrument requiring access authorization, the protected instrument comprising:

a non-cryptographic central processing unit having
an address bus output,
a control bus output, and
a data bus input;

a plurality of peripheral devices;

a program memory, the program memory having data elements stored at access addresses, the data elements being encoded to maintain secrecy of the data elements, and the access addresses being encoded to maintain the secrecy of the data elements, the program memory including
an address bus input,
a control bus input, and
a data bus output;

a first male-female connector combination;

a second male-female connector combination, the female connector of the second male-female connector combination having a socket arrangement which is identical to that of the female connector of the first male-female connector combination, and the male connector of the second male-female connector combination having a pin arrangement which is identical to that of the male connector of the first male-female connector combination;

a means for decoding the encoded data elements and the encoded one of the access addresses and the commands,
the decoding means including a look-up table which is implemented on a single chip and which is used to decode the encoded data elements and the encoded access addresses, the look-up table including
an address bus input,
a control bus input, and an address bus output formed of a data bus output of the look-up table, the decoding means being removably inserted between the program memory and the central processing unit by way of the first male-female connector combination and by way of the second male-female connector combination, the first male-female connector combination removably connecting the decoding means to the central processing unit and the second male-female connector combination removably connecting the decoding means to the program memory, and the decoding means having stored therein a security logic condition whose state determines whether the decoding is performed, wherein, for the decoding of the access addresses, data elements retrieved from the look-up table serve as retrieval addresses for the program memory, wherein, for the decoding of data elements, data elements retrieved from the program memory serve as retrieval addresses for the look-up table, and wherein data elements retrieved from the retrieval addresses of the look-up table represent the data elements retrieved from the program memory in decoded form, and a first set of buses coupling the decoding means, the central processing unit, and the plurality of peripheral devices, the first set of buses including a first address bus on which are commonly disposed (1) the address bus output of the central processing unit and (2) the address bus input of the look-up table, a first data bus on which are commonly disposed (1) the data bus input of the central processing unit and (2) the data bus output of the look-up table, and a first control bus on which are commonly disposed (1) the control bus output of the central processing unit and (2) the control bus input of the look-up table, and the first address bus, the first data bus, and the first control bus being fed through the first male-female connector combination; and a second set of buses coupling the decoding means and the program memory, the second set of buses establishing two way communication links between the decoding means and the program memory and providing the exclusive communication links between the program memory and the remainder of the protected instrument, the second set of buses including a second address bus on which are commonly disposed (1) the address bus output of the look-up table and (2) the address bus input of the program memory, a second data bus on which are commonly disposed (1) the dam bus output of the program memory and (2) the address bus input of the look-up table, the second data bus being coupled to the first address bus, a second control bus on which are commonly disposed (1) one of a control bus output formed by the data bus output of the look-up table and the control bus output of the central processing unit and (2) the control bus input of the program memory, and the second address bus, the second data bus, and the second control bus being fed through the second male-female connector combination;

and wherein the male connector of the first male-female connector combination, the decoding means, and the female connector of the second male-female connector combination are positioned one on top of the other and molded by being encapsulated so as to form a device that is positioned between (1) the female connector of the first male-female connector combination, which is mounted to the main board of the computer based system and (2) the male connector of the second male-female connector combination, which is mounted to the program memory.

2. A method for authorizing access to a protected instrument having a computer-based operating system, a non-cryptographic central processing unit, a memory carrier, a peripheral device, and a program memory having access addresses, the method comprising the steps of:

providing a first set of buses on which the central processing unit, the memory carrier, and the peripheral device are commonly disposed, the first set of buses including a first address bus, a first data bus, and a first control bus;

storing data elements at the access addresses in the program memory, the storing step including the step of maintaining the secrecy of the data elements by encoding (1) the data elements and (2) one of the access addresses and the commands used to access the data elements;

removably inserting a decoding device between the program memory and the memory carrier, the removably inserting step including the step of providing a second set of buses which establish two way communication links between the decoding device and the program memory, the second set of buses including a second address bus, a second data bus, and a second control bus for the program memory; and limiting access to the data elements stored in the program memory, the limiting step including the steps of ascertaining, based on the state of a security logic condition of the decoding device, whether the user of the protected instrument is permitted access to the program memory, and, if the user is permitted access, then accessing the program memory from the central processing unit, the accessing step including the steps of decoding the encoded data elements by referring to a look-up table, decoding the encoded one of the access addresses and the commands by referring to the look-up table, and wherein the decoding step is performed by the decoding device, and wherein the look-up table is implemented on a single chip, and, if the user is not permitted access, then denying the central processing unit access to the encoded data elements and the encoded one of the access addresses and the commands, and wherein the denying step is performed by the decoding device.

3. A method according to claim 2, wherein stored data elements of the look-up table serve as addresses for the program memory and wherein addresses of the look-up table are, at least partially, reading addresses of a program memory.

4. A device according to claim 3, wherein the look-up table comprises two decoding tables, only one of which is correct, and wherein the choice between these two decoding tables is made based on the state of the security logic condition.

5. A method according to claim 4, wherein the security logic condition is set based on data elements pertaining to one of date and duration and wherein the decoding is done based on a comparison between these data elements and data elements given by a clock.

6. A method according to claim 2, wherein the decoding is done with a programmable logic circuit.

7. A method according to claim 2 wherein, for the decoding, parameters are read in the decoding memory and the decoding is done as a function of the parameters read.

8. A method according to claim 5, further comprising the steps of:

concatenating a password N and the number of the protected instrument to obtain a first string of characters;

generating a random number thereby forming a password N+1;

determining data elements pertaining to an updated authorized rental period;

preparing a checking word on the basis of the characters of the password N, the number of the protected instrument, the password N+1 and the data elements;

concatenating the password N+1, the data elements and the checking word to obtain a second string of characters; and combining the first string of characters and the second string of characters to obtain a third string of characters the third string forming a code to be entered into the protected instrument.

9. A method according to claim 8, further comprising the step of extending the amount of authorized access to the protected instrument, the extending step further including the steps of:

entering a code into the protected instrument, wherein the correct code is the code comprised of the third string of characters;

concatenating a password N and the number of the protected instrument in order to obtain the first string of characters;

combining the first string of characters and the entered code in order to extract the password N+1, the data elements and an extracted checking word;

preparing a prepared checking word on the basis of the password N, the number of the protected instrument, the password N+1 and the data elements;

comparing the prepared checking word and the extracted checking word; and in the event of a checking word mismatch, triggering an error step;

in the event of a checking word match, updating the authorized rental period based on the data elements and modifying the password memorized in the protected instrument.

10. A protected instrument requiring access authorization, the protected instrument comprising:

a non-cryptographic central processing unit;

a plurality of peripheral devices;

a program memory, the program memory having data elements stored at access addresses, the data elements being encoded to maintain secrecy of the data elements, and one of the access addresses and the commands used to access the data elements being encoded to maintain the secrecy of the data elements;

a first male-female connector combination;

a second male-female connector combination;

a means for decoding the encoded data elements and the encoded one of the access addresses and the commands, the decoding means including a look-up table which is implemented on a single chip and which is used to decode the encoded data elements and the encoded one of the access addresses and the commands, wherein, for the decoding of data elements, data elements retrieved from the program memory serve as retrieval addresses for the look-up table, and wherein data elements retrieved from the retrieval addresses of the look-up table represent the data elements retrieved from the program memory in decoded form, the decoding means being removably inserted between the program memory and the central processing unit by way of the first male-female connector combination and by way of the second male-female connector combination, the first male-female connector combination removably connecting the decoding means to the central processing unit and the second male-female connector combination removably connecting the decoding means to the program memory, and the decoding means having stored therein a security logic condition whose state determines whether the decoding is performed;

a first set of buses on which the decoding means, the central processing unit, and the plurality of peripheral devices are commonly disposed, the first set of buses including a first address bus, a first data bus, and a first control bus, and the first address bus, the first data bus, and the first control bus being fed through the first male-female connector combination; and a second set of buses on which the decoding means and the program memory are commonly disposed, the second set of buses establishing two way communication links between the decoding means and the program memory and providing the exclusive communication links between the program memory and the remainder of the protected instrument, the second set of buses including a second address bus, a second data bus, and a second control bus for the program memory, and the second address bus, the second data bus, and the second control bus being fed through the second male-female connector combination.

11. A protected instrument according to claim 10, wherein stored data elements of the look-up table serve as addresses for the program memory and wherein addresses of the look-up table are, at least partially, reading addresses of a program memory.

12. A protected instrument according to claim 10, furthermore comprising a saved clock coupled to the decoding means.

13. A protected instrument according to claim 10, wherein the decoding means comprises a microprocessor and means for memorizing data elements pertaining to duration, and wherein the state of the security logic condition is set based on the data elements.

14. A protected instrument according to claim 13, wherein the decoding means comprises interfacing means to enable the data elements of the decoding memory to be modified.

15. A protected instrument according to claim 10, wherein the male connector of the first male-female connector combination, the decoding means, and the female connector of the second male-female connector combination are positioned one on top of the other and molded by being encapsulated so as to form a device that is positioned between (1) the female connector of the first male-female connector combination, which is mounted to the main board of the computer based system and (2) the male connector of the second male-female connector combination, which is mounted to the program memory.

16. A protected instrument according to claim 11, wherein the look-up table comprises two decoding tables, only one of which is correct, and wherein the choice between these two decoding tables is made based on the state of the security logic condition.

17. A protected instrument comprising:

a non-cryptographic central processing unit;

program memory means, the program memory means having data elements stored at access addresses, the data elements being encoded to maintain secrecy of the data elements, and one of the access addresses and the commands used to access the data elements being encoded to maintain the secrecy of the data elements;

a means for decoding the encoded data elements and the encoded one of the access addresses and the commands, the decoding means including a look-up table which is implemented on a single chip and which is used to decode the encoded data elements and the encoded one of the access addresses and the commands, the decoding means having stored therein a security logic state which determines whether the decoding is performed, and the decoding means being coupled to the program memory means; and a memory carrier formed of a connector, the memory carrier being coupled to the program memory means via the decoding means, the memory carrier being coupled to the central processing unit via a set of buses, the set of buses including an address bus, a data bus, and a control bus, and the set of buses being fed through the connector to the decoding means and establishing two way communication links between the central processing unit and the decoding means, the central processing unit and the decoding means being commonly disposed on the first set of buses.

18. A protected instrument according to claim 17, wherein stored data elements of the look-up table serve as addresses for the program memory and wherein addresses of the look-up table are, at least partially, reading addresses of a program memory.

19. A protected instrument according to claim 18, wherein the look-up table comprises two decoding tables, only one of which is correct, and wherein the choice between these two decoding tables is made based on the state of the security logic condition.

\* \* \* \* \*